(12) United States Patent
Lin et al.

(10) Patent No.: US 10,587,857 B2
(45) Date of Patent: *Mar. 10, 2020

(54) METHOD AND APPARATUS HAVING VIDEO DECODING FUNCTION WITH SYNTAX ELEMENT PARSING FOR OBTAINING ROTATION INFORMATION OF CONTENT-ORIENTED ROTATION APPLIED TO 360-DEGREE IMAGE CONTENT OR 360-DEGREE VIDEO CONTENT REPRESENTED IN PROJECTION FORMAT

(71) Applicant: MEDIATEK INC., Hsin-Chu (TW)

(72) Inventors: Hung-Chih Lin, Hsinchu (TW);
Chao-Chih Huang, Hsinchu County (TW); Chia-Ying Li, Hsinchu (TW);
Jian-Liang Lin, Hsin-Chu (TW);
Shen-Kai Chang, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/392,644

(22) Filed: Apr. 24, 2019

(65) Prior Publication Data

US 2019/0251660 A1 Aug. 15, 2019

Related U.S. Application Data

(62) Division of application No. 15/802,481, filed on Nov. 3, 2017.

(Continued)

(51) Int. Cl.
*H04N 13/117* (2018.01)
*G06T 15/10* (2011.01)
(Continued)

(52) U.S. Cl.
CPC .......... *H04N 13/117* (2018.05); *G06T 15/10* (2013.01); *G06T 19/006* (2013.01);
(Continued)

(58) Field of Classification Search
None
See application file for complete search history.

(56) References Cited

U.S. PATENT DOCUMENTS 7,292,722 B2    11/2007 Lelescu
2002/0154812 A1*  10/2002 Chen ................... G06T 3/4038
                                                       382/154

(Continued)

FOREIGN PATENT DOCUMENTS

CN        1367618 A     9/2002
CN      101540926 A     9/2009
(Continued)

OTHER PUBLICATIONS

W. Pogribny & I. Zielinski, "Differential coding and processing of images", 3827 Proc. SPIE 155-163 (Sep. 10, 1999) (Year: 1999).*

(Continued)

*Primary Examiner* — David N Werner
(74) *Attorney, Agent, or Firm* — Winston Hsu

(57) ABSTRACT

A video processing method includes receiving a bitstream, processing the bitstream to obtain at least one syntax element from the bitstream, and decoding the bitstream to generate a current decoded frame having a rotated 360-degree image/video content represented in a 360-degree Virtual Reality (360 VR) projection format. The at least one syntax element signaled via the bitstream indicates rotation information of content-oriented rotation that is involved in generating the rotated 360-degree image/video content, and includes a first syntax element. When the content-oriented (Continued)

rotation is enabled, the first syntax element indicates a rotation degree along a specific rotation axis.

7 Claims, 5 Drawing Sheets

Related U.S. Application Data

(60) Provisional application No. 62/469,041, filed on Mar. 9, 2017, provisional application No. 62/433,272, filed on Dec. 13, 2016, provisional application No. 62/419,513, filed on Nov. 9, 2016.

(51) Int. Cl.
| | |
|---|---|
| *H04N 19/597* | (2014.01) |
| *H04N 5/232* | (2006.01) |
| *H04N 5/341* | (2011.01) |
| *H04N 13/111* | (2018.01) |
| *G06T 19/00* | (2011.01) |
| *H04N 19/70* | (2014.01) |
| *H04N 19/85* | (2014.01) |
| *H04N 13/00* | (2018.01) |
| *H04N 19/00* | (2014.01) |
| *G06T 9/00* | (2006.01) |
| *G06T 3/40* | (2006.01) |

(52) U.S. Cl.
CPC ....... *H04N 5/23238* (2013.01); *H04N 5/3415* (2013.01); *H04N 13/111* (2018.05); *H04N 19/597* (2014.11); *G06T 3/40* (2013.01); *G06T 9/00* (2013.01); *H04N 19/00* (2013.01); *H04N 19/70* (2014.11); *H04N 19/85* (2014.11); *H04N 2013/0088* (2013.01)

(56) References Cited

U.S. PATENT DOCUMENTS

| | | | |
|---|---|---|---|
| 2003/0067536 A1* | 4/2003 | Boulanger | H04N 7/15 348/14.08 |
| 2010/0027615 A1 | 2/2010 | Pandit | |
| 2011/0115886 A1 | 5/2011 | Nguyen | |
| 2012/0230594 A1 | 9/2012 | Boyce | |
| 2013/0021377 A1 | 1/2013 | Doll | |
| 2013/0185353 A1 | 7/2013 | Rondao Alface | |
| 2016/0323561 A1 | 11/2016 | Jin | |
| 2017/0295356 A1* | 10/2017 | Abbas | H04N 5/2251 |
| 2018/0205925 A1* | 7/2018 | Doh | H04N 13/117 |
| 2018/0262774 A1 | 9/2018 | Lin | |

FOREIGN PATENT DOCUMENTS

| | | |
|---|---|---|
| CN | 101729892 A | 6/2010 |
| CN | 102006480 A | 4/2011 |
| CN | 102047668 A | 5/2011 |
| CN | 103392189 A | 11/2013 |
| CN | 103402109 A | 11/2013 |
| CN | 103646424 A | 3/2014 |
| CN | 105872386 A | 8/2016 |
| WO | 2018/093840 A1 | 5/2018 |
| WO | 2018/093840 A8 | 5/2018 |

OTHER PUBLICATIONS

"International Search Report" dated Jan. 19, 2018 for International application No. PCT/CN2017/109894, International filing date:Nov. 8, 2017.

Hung-Chih Lin et al., Title of Invention: Video Processing Apparatus Using One or Both of Reference Frame Re-Rotation and Content-Oriented Rotation Selection and Associated Video Processing Method, U.S. Appl. No. 15/911,185, filed Mar. 5, 2018.

"International Search Report" dated Jun. 4, 2018 for International application No. PCT/CN2018/078448, International filing date Mar. 8, 2018.

Aljoscha Smolic' and David McCutchen, "3DAV Exploration of Video-Based Rendering Technology in MPEG", The IEEE Transactions on Circuits and Systems for Video Technology, vol. 14, No. 3, Mar. 2004, pp. 348-356, © 2004 IEEE.

Chi-Wing Fu et al., "The Rhombic Dodecahedron Map: An Efficient Scheme for Encoding Panoramic Video", IEEE Transactions on Multimedia, vol. 11, No. 4, Jun. 2009, pp. 1-10.

Hung-Chih Lin, Title of Invention: Method and Apparatus Having Video Encoding Function With Syntax Element Signaling of Rotation Information of Content-Oriented Rotation Applied to 360-Degree Image Content or 360-Degree Video Content Represented in Projection Format and Associated Method and Apparatus Having Video Decoding Function, U.S. Appl. No. 15/802,481, filed Nov. 3, 2017.

Search report dated Aug. 7, 2019 for the European Patent Application No. 17 869 318.0 (Publication No. EP 3 476 128), filing date Nov. 8, 2017, pp. 1-12.

Minhua Zhou, AHG8:A study on compression efficiency of cube projection, Joint Video Exploration Team (JVET) of ITU-T SG 16 WP 3 and ISO/IEC JTC 1/SC 29/WG 11, Oct. 15-21, 2016, pp. 1-7, Chengdu, CN, XP030150245.

Philippe Hanhart et al., AHG8:High level syntax extensions for signaling of 360-degree video information, Joint Video Exploration Team(JVET) of ITU-T SG 16 WP 3 and ISO/IEC JTC 1/SC 29/WG 11, Oct. 15-21, 2016, pp. 1-6, Chengdu, CN, XP030150330.

Ye-Kui Wang et al., VR video projection and mapping formats in CICP, International Organisation for Standardisation Organisation Internationale De Normalisation ISO/IEC JTC1/SC29/WG11 Coding of Moving Pictures and Audio, Oct. 2016, Chengdu, China, XP030067696.

Jill Boyce et al., AHG8:Spherical rotation orientation SEI for coding of 360 video, Joint Video Exploration Team(JVET) of ITU-T SG 16 WP 3 and ISO/IEC JTC 1/SC 29/WG 11, Jan. 12-20, 2017, pp. 1-7, Geneva, CH, XP030150560.

Hung-Chin Lin et al., AHG8:Yaw-roll-pitch orientation for VR360 video content, Joint Video Exploration Team(JVET) of ITU-T SG 16 WP 3 and ISO/IEC JTC 1/SC 29/WG 11, Jan. 12-20, 2017, pp. 1-4, Geneva, CH, XP030150541.

\* cited by examiner

METHOD AND APPARATUS HAVING VIDEO DECODING FUNCTION WITH SYNTAX ELEMENT PARSING FOR OBTAINING ROTATION INFORMATION OF CONTENT-ORIENTED ROTATION APPLIED TO 360-DEGREE IMAGE CONTENT OR 360-DEGREE VIDEO CONTENT REPRESENTED IN PROJECTION FORMAT

CROSS REFERENCE TO RELATED APPLICATION

This is a divisional application of U.S. application Ser. No. 15/802,481 filed Nov. 3, 2017, which claims the benefit of U.S. provisional application No. 62/419,513 filed Nov. 9, 2016, U.S. provisional application No. 62/433,272 filed Dec. 13, 2016 and U.S. provisional application No. 62/469,041 filed Mar. 9, 2017. The entire contents of related applications, including U.S. application Ser. No. 15/802,481, U.S. provisional application No. 62/419,513, U.S. provisional application No. 62/433,272, and U.S. provisional application No. 62/469,041 filed Mar. 9, 2017, are incorporated herein by reference.

BACKGROUND

The present invention relates to 360-degree image/video content processing, and more particularly, to method and apparatus having a video decoding function with syntax element parsing for obtaining rotation information of content-oriented rotation applied to a 360-degree image/video content represented in a projection format.

Virtual reality (VR) with head-mounted displays (HMDs) is associated with a variety of applications. The ability to show wide field of view content to a user can be used to provide immersive visual experiences. A real-world environment has to be captured in all directions resulting in an omnidirectional video corresponding to a viewing sphere. With advances in camera rigs and HMDs, the delivery of VR content may soon become the bottleneck due to the high bitrate required for representing such a 360-degree image/video content. When the resolution of the omnidirectional video is 4K or higher, data compression/encoding is critical to bitrate reduction.

In general, the omnidirectional video corresponding to a viewing sphere is transformed into a sequence of images, each of which is represented by a 360-degree Virtual Reality (360 VR) projection format, and then the resulting image sequence is encoded into a bitstream for transmission. However, the original 360-degree image/video content represented in the 360 VR projection format may have poor compression efficiency due to moving objects split and/or stretched by the employed 360 VR projection format. Thus, there is a need for an innovative design which is capable of improving compression efficiency of a 360-degree image/video content represented in a 360 VR projection format.

SUMMARY

One of the objectives of the claimed invention is to provide method and apparatus having a video decoding function with syntax element parsing for obtaining rotation information of content-oriented rotation applied to a 360-degree image/video content represented in a projection format.

According to a first aspect of the present invention, an exemplary video processing method is disclosed. The exemplary video processing method includes: receiving a bitstream; processing the bitstream to obtain at least one syntax element from the bitstream; and decoding the bitstream to generate a current decoded frame having a rotated 360-degree image/video content represented in a 360-degree Virtual Reality (360 VR) projection format. The at least one syntax element signaled via the bitstream indicates rotation information of content-oriented rotation that is involved in generating the rotated 360-degree image/video content, and includes a first syntax element, wherein when the content-oriented rotation is enabled, the first syntax element indicates a rotation degree along a specific rotation axis.

According to a second aspect of the present invention, an exemplary video processing apparatus is disclosed. The exemplary video processing apparatus includes a video decoder. The video decoder is arranged to receive a bitstream, process the bitstream to obtain at least one syntax element from the bitstream, and decode the bitstream to generate a current decoded frame having a rotated 360-degree image/video content represented in a 360-degree Virtual Reality (360 VR) projection format. The at least one syntax element signaled via the bitstream indicates rotation information of content-oriented rotation that is involved in generating the rotated 360-degree image/video content, and includes a syntax element, wherein when the content-oriented rotation is enabled, the syntax element indicates a rotation degree along a specific rotation axis.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
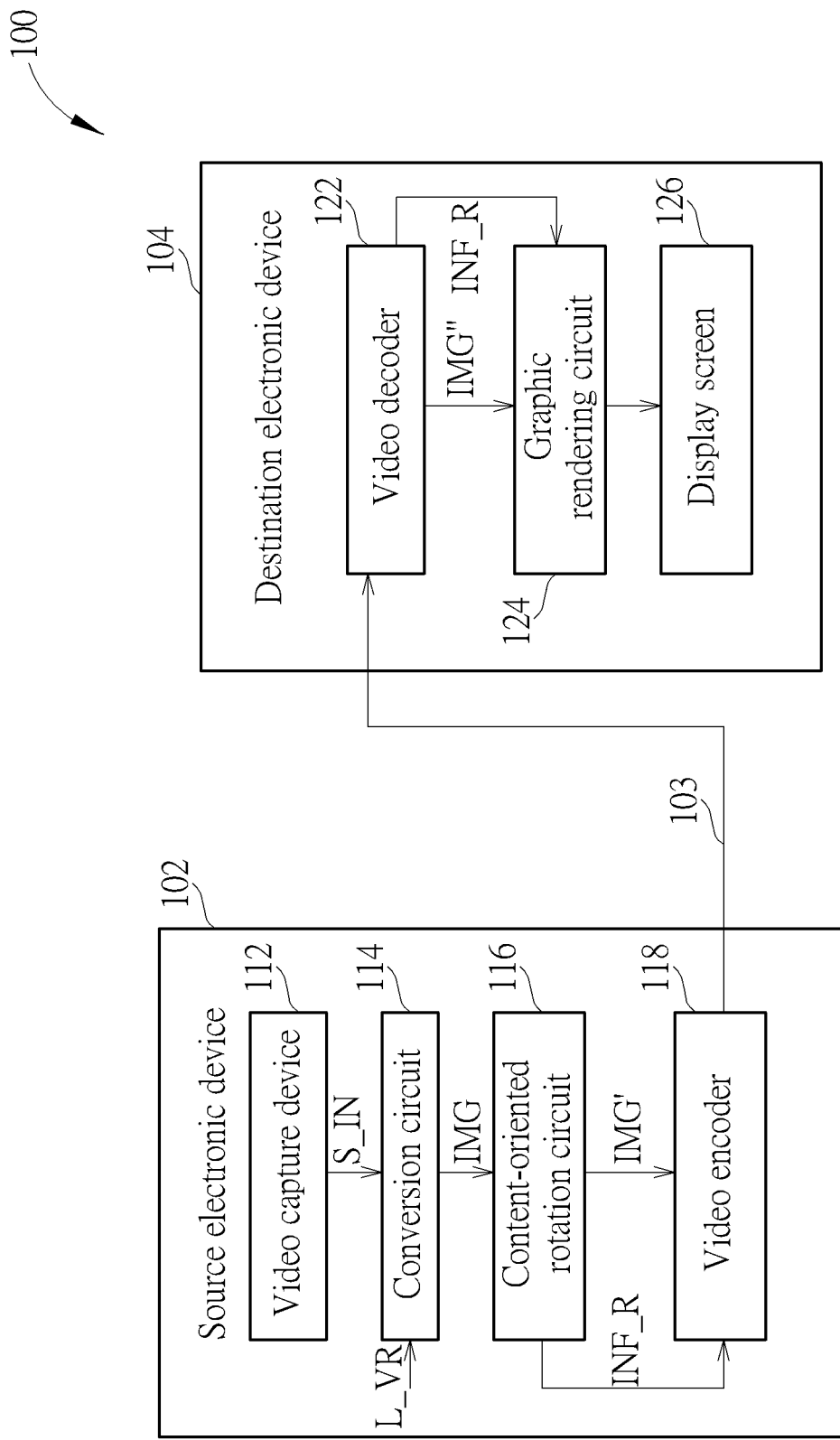
FIG. 1 is a diagram illustrating a 360-degree Virtual Reality (360 VR) system according to an embodiment of the present invention.

FIG. 1 is a diagram illustrating a 360-degree Virtual Reality (360 VR) system according to an embodiment of the present invention. The 360 VR system 100 includes a source electronic device 102 and a destination device 104. The source electronic device 102 includes a video capture device 112, a conversion circuit 114, a content-oriented rotation circuit 116, and a video encoder 118. For example, the video capture device 112 may be a set of cameras used to provide an omnidirectional image content (e.g., multiple images that cover the whole surroundings) S_IN corresponding to a viewing sphere. The conversion circuit 114 generates a current input frame IMG with a 360-degree Virtual Reality (360 VR) projection format L_VR according to the omnidirectional image content S_IN. In this example, the conversion circuit 114 generates one input frame for each video frame of the 360-degree video provided from the video capture device 112. The 360 VR projection format L_VR employed by the conversion circuit 114 may be any of available projection formats, including an equirectangular projection (ERP) format, a cubemap projection (CMP) format, an octahedron projection (OHP) format, an icosahedron projection (ISP) format, etc. The content-oriented rotation circuit 116 receives the current input frame IMG (which has the 360-degree image/video content represented in the 360 VR projection format L_VR), and applies content-oriented rotation to the 360-degree image/video content in the current input frame IMG to generate a content-rotated frame IMG' having a rotated 360-degree image/video content represented in the same 360 VR projection format L_VR. In addition, the rotation information INF_R of the applied content-oriented rotation is provided to the video encoder 118 for syntax element signaling.

Figure 2:
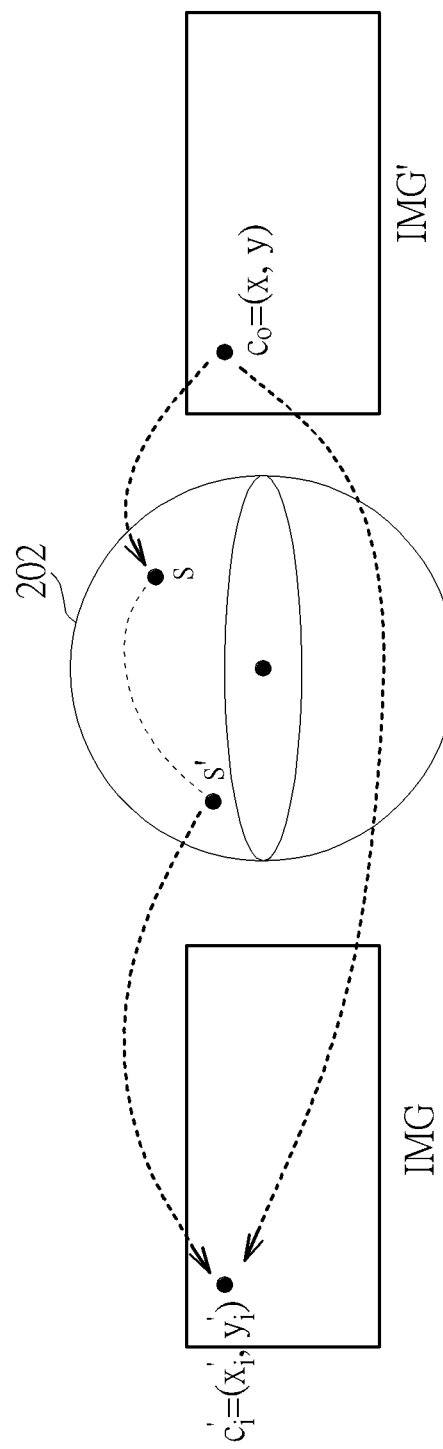
FIG. 2 is a diagram illustrating a concept of the proposed content-oriented rotation according to an embodiment of the present invention.

FIG. 2 is a diagram illustrating a concept of the proposed content-oriented rotation according to an embodiment of the present invention. For clarity and simplicity, it is assumed that the 360 VR projection format L_VR is an ERP format. Hence, a 360-degree image/video content of a viewing sphere 202 is mapped onto a rectangular projection face via an equirectangular projection of the viewing sphere 202. In this way, the current input frame IMG having the 360-degree image/video content represented in the ERP format is generated from the conversion circuit 114. As mentioned above, an original 360-degree image/video content represented in a 360 VR projection format may have poor compression efficiency due to moving objects split and/or stretched by the employed 360 VR projection format. To address this issue, the present invention proposes applying content-oriented rotation to the 360-degree image/video content for coding efficiency improvement.

Moreover, an example for calculating a pixel value at a pixel position in the content-rotated frame IMG' is shown in FIG. 2. For a pixel position $c_o$ with a coordinate (x, y) in the content-rotated frame IMG', the 2D coordinate (x, y) can be mapped into a 3D coordinate s (a point on the viewing sphere 202) though 2D-to-3D mapping process. Then, this 3D coordinate s is transformed to another 3D coordinate s' (a point on the viewing sphere 202) after the content-oriented rotation is performed. The content-oriented rotation can be achieved by a rotation matrix multiplication. Finally, a corresponding 2D coordinate with a coordinate $(x'_i, y'_i)$ can be found in the current input frame IMG though 3D-to-2D mapping process. Therefore, for each integer pixel (e.g., $c_o$=(x, y)) in the content-rotated frame IMG', a corresponding position (e.g., $c_i'=(x'_i, y'_i)$) in the current input frame IMG can be found though 2D-to-3D mapping from the content-rotated frame IMG' to the viewing sphere 202, a rotation matrix multiplied at the viewing sphere 202 for content rotation, and 3D-to-2D mapping from the viewing sphere 202 to the current input frame IMG. If one or both of $x'_i$ and $y'_i$ are non-integer positions, an interpolation filter (not shown) may be applied to integer pixels around the point $c_i'=(x'_i, y'_i)$ in the current input frame IMG to derive the pixel value of $c_o$=(x, y) in the content-rotated frame IMG'.

In contrast to a conventional video encoder that encodes the current input frame IMG into a bitstream for transmission, the video encoder 118 encodes the content-rotated frame IMG' into a bitstream BS, and then outputs the bitstream BS to the destination electronic device 104 via a transmission means 103 such as a wired/wireless communication link or a storage medium. Specifically, the video encoder 118 generates one encoded frame for each content-rotated frame output from the content-oriented rotation circuit 116. Hence, consecutive encoded frames are generated from the video encoder 118, sequentially. In addition, the rotation information INF_R of the content-oriented rotation performed at the content-oriented rotation circuit 116 is provided to the video encoder 118. Hence, the video encoder 118 further signals syntax element(s) via the bitstream BS, wherein the syntax element(s) are set to indicate the rotation information INF_R of the content-oriented rotation applied to the current input frame IMG.

Figure 3:
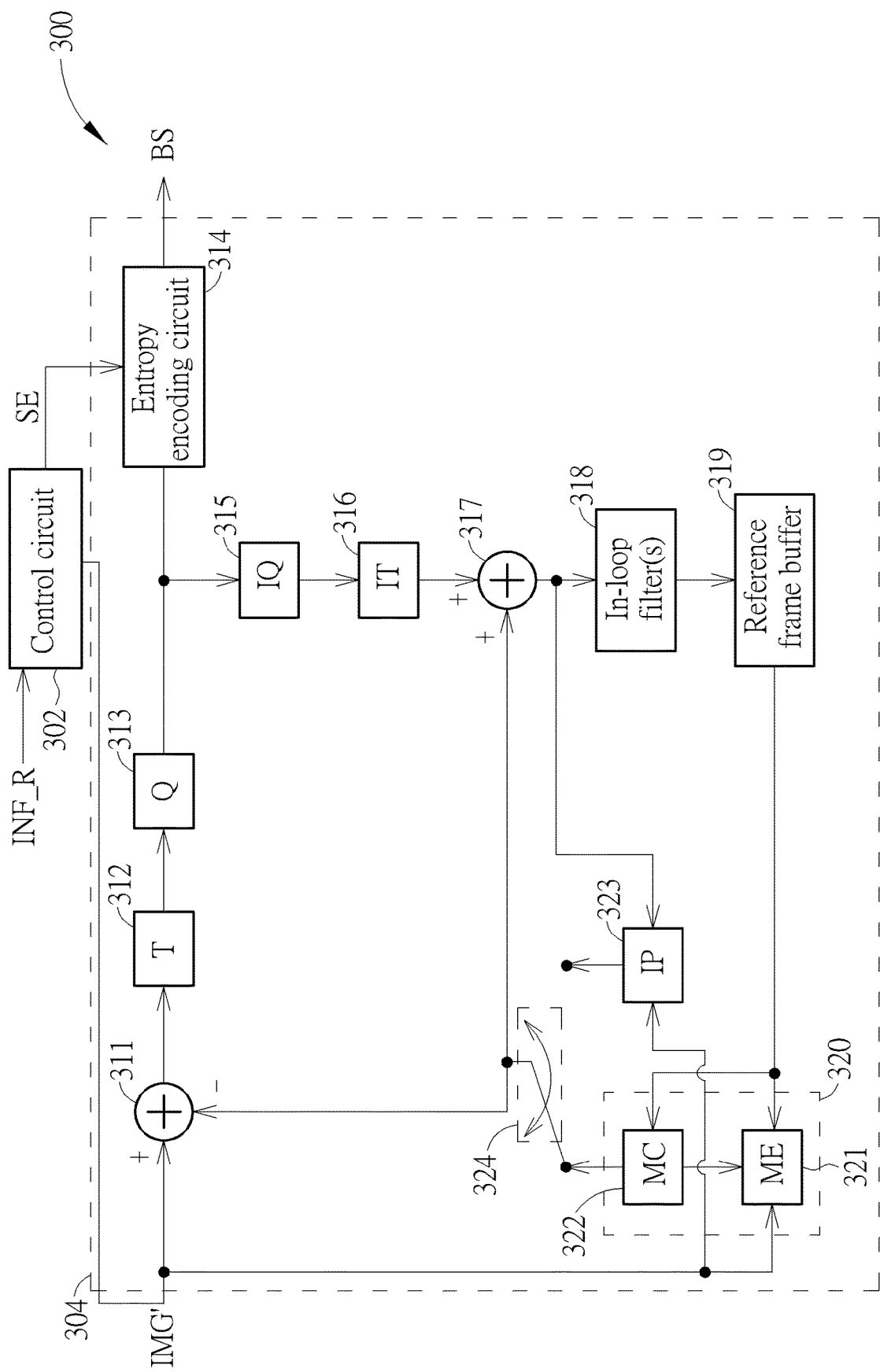
FIG. 3 is a diagram illustrating a video encoder according to an embodiment of the present invention.

FIG. 3 is a diagram illustrating a video encoder according to an embodiment of the present invention. The video encoder 118 shown in FIG. 1 may be implemented using the video encoder 300 shown in FIG. 3. The video encoder 300 is a hardware circuit used to compress a raw video data to generate a compressed video data. As shown in FIG. 3, the video encoder 300 includes a control circuit 302 and an encoding circuit 304. It should be noted that the video encoder architecture shown in FIG. 3 is for illustrative purposes only, and is not meant to be a limitation of the present invention. For example, the architecture of the encoding circuit 304 may vary depending upon the coding standard. The encoding circuit 304 encodes the content-rotated frame IMG' (which has the rotated 360-degree image/video content represented by the 360 VR projection layout L_VR) to generate the bitstream BS. As shown in FIG. 3, the encoding circuit 304 includes a residual calculation circuit 311, a transform circuit (denoted by "T") 312, a quantization circuit (denoted by "Q") 313, an entropy encoding circuit (e.g., a variable length encoder) 314, an inverse quantization circuit (denoted by "IQ") 315, an inverse transform circuit (denoted by "IT") 316, a reconstruction circuit 317, at least one in-loop filter 318, a reference frame buffer 319, an inter prediction circuit 320 (which includes a motion estimation circuit (denoted by "ME") 321 and a motion compensation circuit (denoted by "MC") 322), an intra prediction circuit (denoted by "IP") 323, and an intra/inter mode selection switch 324. Since basic functions and operations of these circuit components implemented in the encoding circuit 304 are well known to those skilled in the pertinent art, further description is omitted here for brevity.

The major difference between the video encoder 300 and a typical video encoder is that the control circuit 302 is used to receive the rotation information INF_R from a preceding circuit (e.g., content-oriented rotation circuit 116 shown in FIG. 1) and set at least one syntax element (SE) according to the rotation information INF_R, wherein the syntax element(s) indicative of the rotation information INF_R will be signaled to a video decoder via the bitstream BS generated from the entropy encoding circuit 314. In this way, the destination electronic device 104 (which has a video decoder) can know details of the encoder-side content-oriented rotation according to the signaled syntax element (s), and can, for example, perform a decoder-side inverse content-oriented rotation to obtain the needed video data for rendering and displaying.

The content-oriented rotation performed at the content-oriented rotation circuit 116 may be specified by rotation axes, a rotation order and rotation angles. The content-oriented rotation may include elemental rotations along a set of rotation axes in a rotation order, where the rotation order specifies an order of rotation axes used by the content-oriented rotation, and each elemental rotation along a corresponding rotation axis is represented by a rotation angle with a particular rotation degree. For example, the rotation axes may be three orthogonal axes (e.g., x-axis, y-axis, z-axis) in Cartesian coordinate system, and the rotation order may be a commonly used specific order yaw-pitch-roll (e.g., z-y-x). However, these are for illustrative purposes only, and are not meant to be limitations of the present invention. For example, the rotation axes are not required to be orthogonal axes. For another example, the number of rotation axes and the number of rotation angles may be adjusted. In a case where only a single rotation axis is involved in the content-oriented rotation, the rotation order can be omitted.

Figure 4:
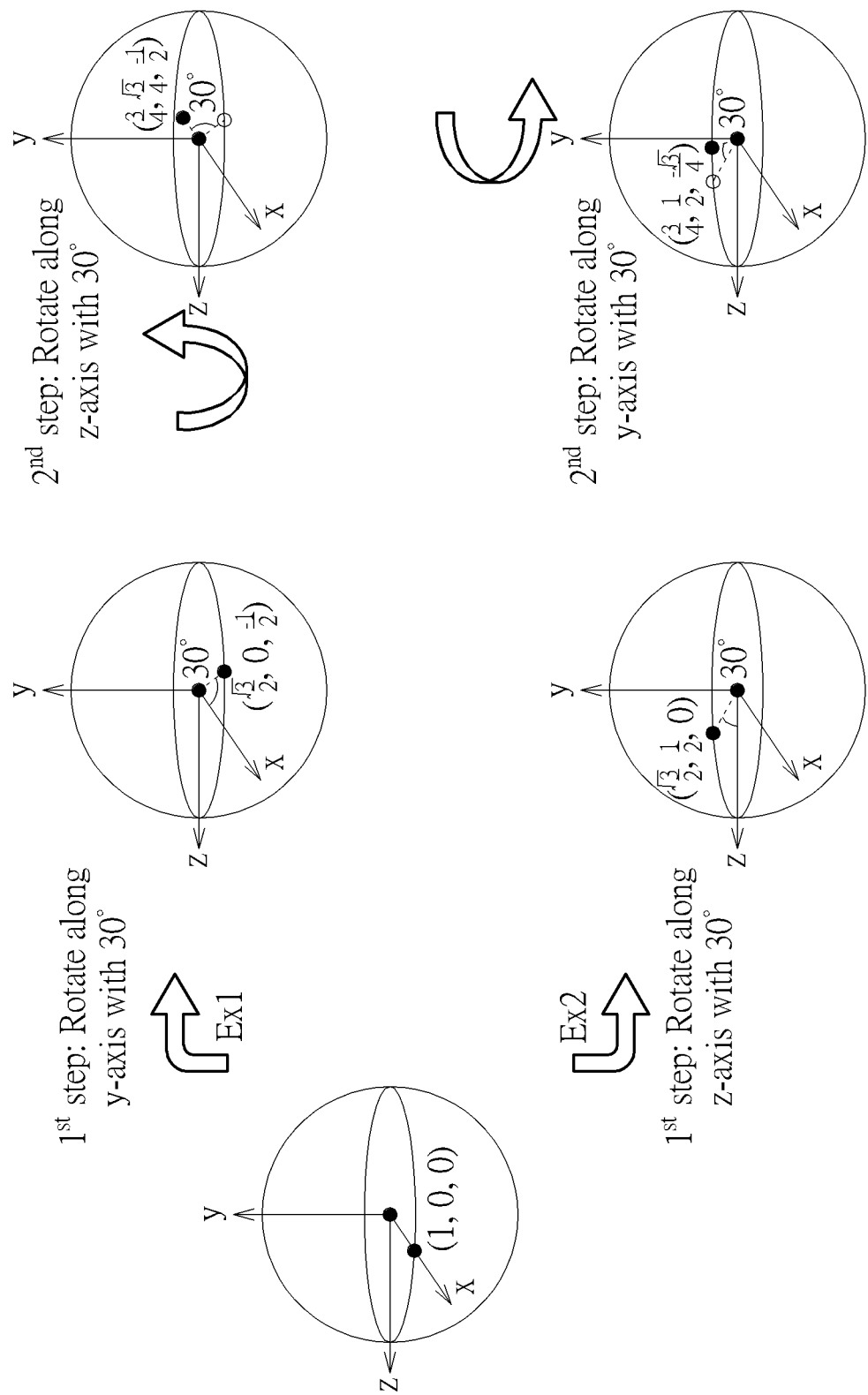
FIG. 4 is a diagram illustrating content-oriented rotations performed using different rotation orders with same rotation angles according to an embodiment of the present invention.

It should be noted that different rotation orders with same rotation angles may create different results. FIG. 4 is a diagram illustrating content-oriented rotations performed using different rotation orders with same rotation angles according to an embodiment of the present invention. The content-oriented rotation in the first example Ex1 includes rotating along y-axis with 30° and then rotating along z-axis with 30°. The other content-oriented rotation in the second example Ex2 includes rotating along z-axis with 30° and then rotating along y-axis with 30°. As shown in FIG. 4, the image/video content at (x, y, z)=(1, 0, 0) is rotated to $$(x, y, z) = \left(\frac{3}{4}, \frac{\sqrt{3}}{4}, \frac{-1}{2}\right)$$

according to the content-oriented rotation in the first example Ex1, and is rotated to $$(x, y, z) = \left(\frac{3}{4}, \frac{1}{2}, \frac{-\sqrt{3}}{4}\right)$$

according to the content-oriented rotation in the second example Ex2. Hence, in addition to rotation axes and associated rotation angles, the rotation order needs to be precisely defined in the content-oriented rotation.

Each rotation axis may be pre-defined (e.g., defined in specification text) in an encoder side and a decoder side. Hence, information of multiple rotation axes (or single rotation axis) used by the content-oriented rotation performed at the content-oriented rotation circuit 116 is not needed to be signaled via the bitstream BS. Alternatively, each rotation axis may be actively set by the content-oriented rotation circuit 116. Hence, information of multiple rotation axes (or single rotation axis) used by the content-oriented rotation performed at the content-oriented rotation circuit 116 is needed to be signaled via the bitstream BS.

The rotation order may be pre-defined (e.g., defined in specification text) in an encoder side and a decoder side. Hence, information of the rotation order used by the content-oriented rotation performed at the content-oriented rotation circuit 116 is not needed to be signaled via the bitstream BS. Alternatively, the rotation order may be actively set by the content-oriented rotation circuit 116. Hence, information of the rotation order used by the content-oriented rotation performed at the content-oriented rotation circuit 116 is needed to be signaled via the bitstream BS.

A rotation degree of a rotation angle associated with each rotation axis may vary for different frames. Hence, information of multiple rotation degrees (or single rotation degree) used by the content-oriented rotation performed at the content-oriented rotation circuit 116 is needed to be signaled via the bitstream BS.

As mentioned above, syntax element(s) SE are set to indicate the rotation information INF_R of the content-oriented rotation applied to the current input frame IMG. In a first case where rotation axes are pre-defined in an encoder side and a decoder side, the rotation information INF_R provided from the content-oriented rotation circuit 116 to the video encoder 118 includes rotation order and rotation degrees that will be indicated by syntax elements signaled from the encoder side to the decoder side. In a second case where rotation axes and rotation order are pre-defined in an encoder side and a decoder side, the rotation information INF_R provided from the content-oriented rotation circuit 116 to the video encoder 118 includes rotation degrees that will be indicated by syntax elements signaled from the encoder side to the decoder side. In a third case where the rotation order is pre-defined in an encoder side and a decoder side, the rotation information INF_R provided from the content-oriented rotation circuit 116 to the video encoder 118 includes rotation axes and rotation degrees that will be indicated by syntax elements signaled from the encoder side to the decoder side. In a fourth case where none of rotation axes and rotation order is pre-defined in an encoder side and a decoder side, the rotation information INF_R provided from the content-oriented rotation circuit 116 to the video encoder 118 includes rotation axes, rotation order and rotation degrees that will be indicated by syntax elements signaled from the encoder side to the decoder side.

Please refer to FIG. 1 again. The destination electronic device 104 may be a head-mounted display (HMD) device. As shown in FIG. 1, the destination electronic device 104 includes a video decoder 122, a graphic rendering circuit 124, and a display screen 126. The video decoder 122 receives the bitstream BS from the transmission means 103 (e.g., a wired/wireless communication link or a storage medium), and decodes the received bitstream BS to generate a current decoded frame IMG". Specifically, the video decoder 122 generates one decoded frame for each encoded frame delivered by the transmission means 103. Hence, consecutive decoded frames are generated from the video decoder 122, sequentially. In this embodiment, the content-rotated frame IMG' to be encoded by the video encoder 118 has a 360 VR projection format. Hence, after the bitstream BS is decoded by the video decoder 122, the current decoded frame (i.e., reconstructed frame) IMG" has the same 360 VR projection format.

Figure 5:
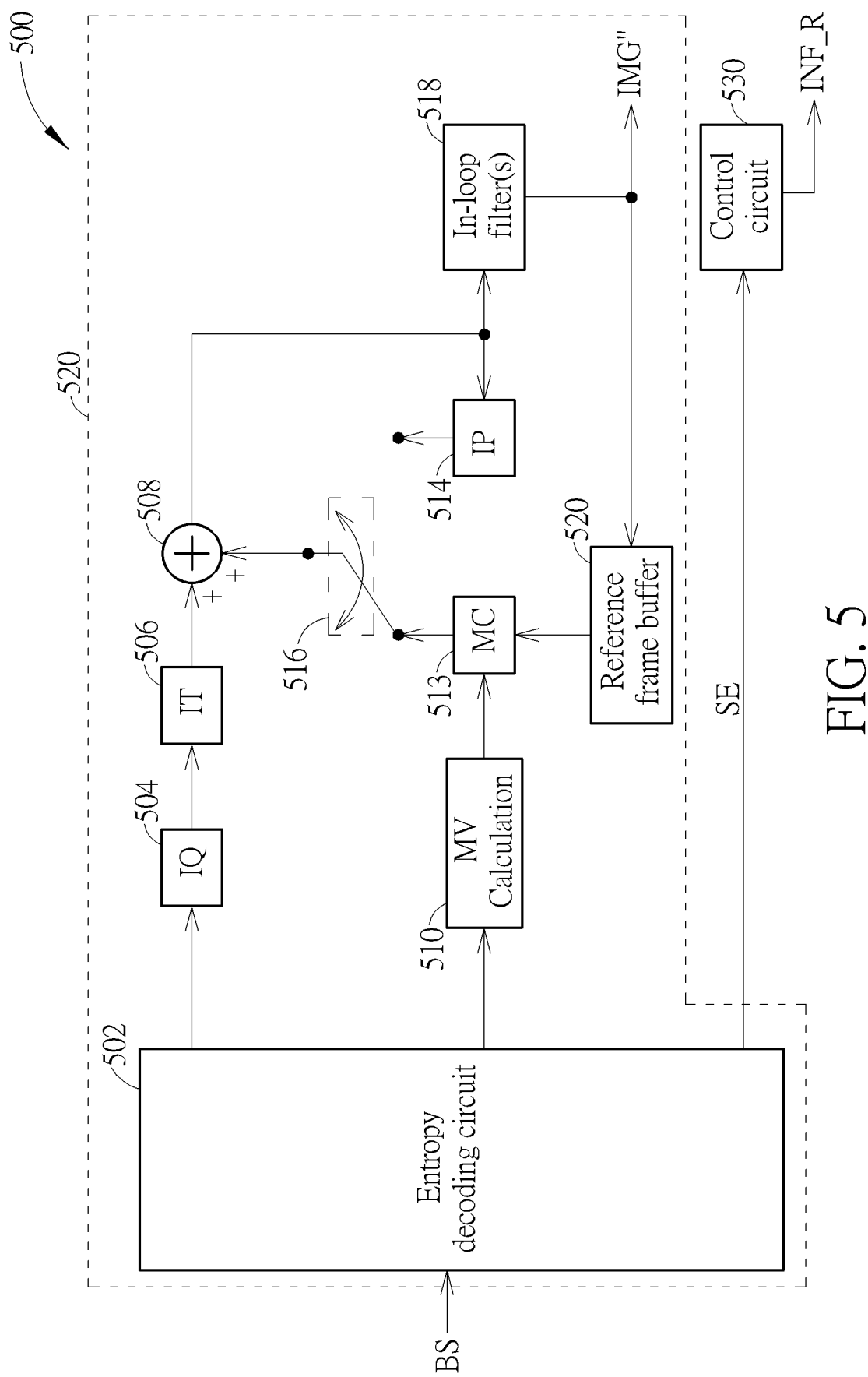
FIG. 5 is a diagram illustrating a video decoder according to an embodiment of the present invention.

FIG. 5 is a diagram illustrating a video decoder according to an embodiment of the present invention. The video decoder 122 shown in FIG. 1 may be implemented using the video decoder 500 shown in FIG. 5. The video decoder 500 may communicate with a video encoder (e.g., video encoder 118 shown in FIG. 1) via a transmission means such as a wired/wireless communication link or a storage medium. The video decoder 500 is a hardware circuit used to decompress a compressed image/video data to generate a decompressed image/video data. In this embodiment, the video decoder 500 receives the bitstream BS, and decodes the received bitstream BS to generate a current decoded frame IMG". As shown in FIG. 5, the video decoder 500 includes a decoding circuit 520 and a control circuit 530. It should be noted that the video decoder architecture shown in FIG. 5 is for illustrative purposes only, and is not meant to be a limitation of the present invention. For example, the architecture of the decoding circuit 520 may vary depending upon the coding standard. The decoding circuit 520 includes an entropy decoding circuit (e.g., a variable length decoder) 502, an inverse quantization circuit (denoted by "IQ") 504, an inverse transform circuit (denoted by "IT") 506, a reconstruction circuit 508, a motion vector calculation circuit (denoted by "MV Calculation") 510, a motion compensation circuit (denoted by "MC") 513, an intra prediction circuit (denoted by "IP") 514, an intra/inter mode selection switch 516, at least one in-loop filter 518, and a reference frame buffer 520. Since basic functions and operations of these circuit components implemented in the decoding circuit 520 are well known to those skilled in the pertinent art, further description is omitted here for brevity.

The major difference between the video decoder 500 and a typical video decoder is that the entropy decoding circuit 502 is further used to perform data processing (e.g., syntax parsing) upon the bitstream BS to obtain syntax element(s) SE signaled by the bitstream BS, and output the obtained syntax element(s) SE to the control circuit 530. Hence, regarding the current decoded frame IMG" that corresponds to the content-rotated frame IMG' generated from the current input frame IMG, the control circuit 530 can refer to the syntax element(s) SE to determine the rotation information INF_R of the encoder-side content-oriented rotation applied to the current input frame IMG.

As mentioned above, the current decoded frame IMG" has a rotated 360-degree image/video content represented in a 360 VR projection format. In this embodiment, the syntax element(s) SE obtained from the bitstream BS indicate the rotation information INF_R of the content-oriented rotation involved in generating the rotated 360-degree image/video content represented in the 360 VR projection format. In a first case where rotation axes are pre-defined in an encoder side and a decoder side (particularly, content-oriented rotation circuit 116 and graphic rendering circuit 124), the rotation information INF_R provided from the control circuit 530 includes rotation order and rotation degrees that are indicated by signaled syntax elements. In a second case where rotation axes and rotation order are pre-defined in an encoder side and a decoder side (particularly, content-oriented rotation circuit 116 and graphic rendering circuit 124), the rotation information INF_R provided from the control circuit 530 includes rotation degrees that are indicated by signaled syntax elements. In a third case where the rotation order is pre-defined in an encoder side and a decoder side (particularly, content-oriented rotation circuit 116 and graphic rendering circuit 124), the rotation information INF_R provided from the control circuit 530 includes rotation axes and rotation degrees that are indicated by signaled syntax elements. In a fourth case where none of rotation axes and rotation order is pre-defined in an encoder side and a decoder side (particularly, content-oriented rotation circuit 116 and graphic rendering circuit 124), the rotation information INF_R provided from the control circuit 530 includes rotation axes, rotation order and rotation degrees that are indicated by signaled syntax elements.

The graphic rendering circuit 124 renders and displays an output image data on the display screen 126 according to the current decoded frame IMG" and the rotation information INF_R of content-oriented rotation involved in generating the rotated 360-degree image/video content. For example, according to the rotation information INF_R derived from the signaled syntax element(s) SE, the rotated 360-degree image/video content represented in the 360 VR projection format may be inversely rotated, and the inversely rotated 360-degree image/video content represented in the 360 VR projection format may be used for rendering and displaying.

For better understanding of technical features of the present invention, several exemplary syntax signaling methods are described as below. The video encoder 118/300 may employ one of the proposed syntax signaling methods to signal the syntax element(s) SE indicative of the rotation information INF_R of content-oriented rotation applied to the 360-degree image/video content represented in the 360 VR projection format, and the video decoder 122/500 may refer to the syntax element(s) SE signaled by one proposed syntax signaling method employed by the video encoder 118/300 to determine rotation information INF_R of content-oriented rotation involved in generating the rotated 360-degree image/video content represented in the 360 VR projection format.

It should be noted that the descriptors in the following exemplary syntax tables specify the parsing process of each syntax element. Specifically, the syntax elements could be coded by fixed length coding (e.g., f(n), i(n) or u(n)) and/or variable length coding (e.g., ce(v), se(v) or ue(v)). The descriptor f(n) describes a fixed-pattern bit string using n bits written (from left to right) with the left bit first. The descriptor i(n) describes a signed integer using n bits. The descriptor u(n) describes an unsigned integer using n bits. The descriptor ce(v) describes a context-adaptive variable-length entropy-coded syntax element with the left bit first. The descriptor se(v) describes a signed integer Exp-Golomb-coded syntax element with the left bit first. The syntax element ue(v) describes an unsigned integer Exp-Golomb-coded syntax element with the left bit first.

In accordance with a first syntax signaling method, the following syntax table may be employed.

| vr_content_orientation_extension( ) { | Descriptor |
|---|---|
|   zero_yaw_orientation | u(1) |
|   if (!zero_yaw_orientation){ | |
|     yaw_orientation_index | u(3) |
|     if (yaw_orientation_index == '111') | |
|       yaw_orientation_degree | u(9) |
|   } | |
|   zero_roll_orientation | u(1) |
|   if (!zero_roll_orientation){ | |
|     roll_orientation_index | u(3) |
|     if (roll_orientation_index == '111') | |
|       roll_orientation_degree | u(9) |
|   } | |
|   zero_pitch_orientation | u(1) |
|   if (!zero_pitch_orientation){ | |
|     pitch_orientation_index | u(3) |
|     if (pitch_orientation_index == '111') | |
|       pitch_orientation_degree | u(8) |
|   } | |
| } | |

When the first syntax signaling method is employed, the rotation information of content-oriented rotation may be indicated in a sequence-level header. For example, H.264 and H.265 can have multiple Sequence Parameter Set (SPS)/Picture Parameter Set (PPS) that are referred to by each slice. Each slice can obtain the corresponding coding parameters according to its PPS/SPS identifier (ID). Hence, the rotation information of content-oriented rotation may be indicated in SPS/PPS or Supplementary Enhancement Information (SEI) by signaling a rotation degree of each rotation axis. When decoding one video frame, the video decoder 122 can obtain the rotation information by referring to a corresponding SPS/PPS ID or SEI.

The syntax element zero_yaw_orientation is set to indicate whether or not there is rotation along the yaw-axis (e.g., z-axis). The syntax element zero_roll_orientation is set to indicate whether or not there is rotation along the roll-axis (e.g., x-axis). The syntax element zero_pitch_orientation is set to indicate whether or not there is rotation along the pitch-axis (e.g., y-axis). When there is rotation along the yaw-axis (i.e., !zero_yaw_orientation==True), the syntax element yaw_orientation_index is set by an index value selected from a plurality of pre-defined index values, where the pre-defined index values are mapped to different pre-defined rotation degrees and a user-defined rotation degree, respectively. For example, the mapping between an index value and a rotation degree may be defined by the following table.

| Orientation_index | Rotation degree |
|---|---|
| 000 | 45 |
| 001 | 90 |
| 010 | 135 |
| 011 | 180 |
| 100 | 225 |
| 101 | 270 |
| 110 | 315 |
| 111 | User-defined |

If the rotation degree of rotation along the yaw-axis is not indexed by any of '000'-'110' (i.e., yaw_orientation_index=='111'), the user-defined rotation degree is signaled by setting the syntax element yaw_orientation_degree.

When there is rotation along the roll-axis (i.e., !zero_roll_orientation==True), the syntax element roll_orientation_index is set by an index value selected from the pre-defined index values as listed in the above table. If the rotation degree of rotation along the roll-axis is not indexed by any of '000'-'110' (i.e., roll_orientation_index=='111'), the user-defined rotation degree is signaled by setting the syntax element roll_orientation_degree.

When there is rotation along the pitch-axis (i.e., !zero_pitch_orientation==True), the syntax element pitch_orientation_index is set by an index value selected from the pre-defined index values listed in the above table. If the rotation degree of rotation along the pitch-axis is not indexed by any of '000'-'110' (i.e., pitch_orientation_index=='111'), the user-defined rotation degree is signaled by setting the syntax element pitch_orientation_degree.

To represent all possible content-oriented rotations, the ranges of the rotation degree of these three axes do not need to be from −180° to 180° (i.e., 0°-360°). In fact, one of the rotation ranges being from −90° to 90° (i.e., 0°-180°) and the others being from −180° to 180° (i.e., 0°-360°) are sufficient for the representation of the content-oriented rotation. In the first syntax signaling method, the rotation angles are assumed to be integer values. Regarding user-defined rotation degrees of the first rotation axis (e.g., yaw-axis or z-axis) and the second rotation axis (e.g., roll-axis or x-axis) in a rotation order (e.g., yaw-roll-pitch (z-x-y)), each is set by 9 bits to indicate a rotation degree within a range from −180° to 180° (i.e., 0°-360°). However, regarding a user-defined rotation degree of the third rotation axis (e.g., pitch-axis or y-axis) in the rotation order (e.g., yaw-roll-pitch (z-x-y)), the range of the user-defined rotation degree is only from −90° to 90° (i.e., 0°-180°). Hence, 8 bits are sufficient to represent the user-defined rotation degree of the third rotation axis (e.g., pitch-axis or y-axis).

In accordance with a second syntax signaling method, the following syntax table may be employed.

| vr_content_orientation_extension( ) { | Descriptor |
|---|---|
| prev_orientation | u(1) |
| if (!prev_orientation) | |
| { | |
| zero_yaw_orientation | u(1) |
| if (!zero_yaw_orientation) | |
| yaw_orientation_diff | se(v) |
| zero_roll_orientation | u(1) |
| if (!zero_roll_orientation) | |
| roll_orientation_diff | se(v) |
| zero_pitch_orientation | u(1) |
| if (!zero_pitch_orientation) | |
| pitch_orientation_diff | se(v) |
| } | |
| } | |

When the second syntax signaling method is employed, the rotation information of content-oriented rotation may be indicated in a sequence-level header in a time-duration of video frames. For example, Audio Video coding Standard (AVS) has one SPS for a time-duration of video frames. These video frames in the same time-duration have the same sequence-level coding parameters. Hence, the rotation information of content-oriented rotation may be indicated in a current time-duration of video frames, and may be updated for a next time-duration of video frames. In some embodiments of the present invention, the rotation information of content-oriented rotation may be indicated in SPS/PPS or Supplementary Enhancement Information (SEI) in a time-duration of video frames. Alternatively, when the second syntax signaling method is employed, the rotation information of content-oriented rotation may be indicated in a picture-level header. Hence, the rotation information of content-oriented rotation is signaled for each video frame.

The syntax element prev_orientation is set to indicate whether or not the content-oriented rotation applied to a current input frame is same as content-oriented rotation applied to at least one previous input frame. For example, concerning a case where the rotation information of content-oriented rotation is indicated in a sequence-level header in a time-duration of video frames, the current input frame may be the first video frame in a current time-duration of video frames, and each of the at least one previous input frame may be one video frame in a previous time-duration of video frames immediately followed by the current time-duration of video frames. For another example, concerning a case where the rotation information of content-oriented rotation is indicated in a picture-level header for each video frame, the at least one previous input frame and the current input frame are two consecutive video frames. Hence, the one-bit syntax element prev_orientation can be signaled to save syntax bits representing the rotation angle information when the content-oriented rotation of current time-duration of video frames is the same as that of previous time-duration of video frames.

When the content-oriented rotation applied to the current input frame is different from the content-oriented rotation applied to the at least one previous input frame (i.e., !prev_orientation==True), the syntax element zero_yaw_orientation is set to indicate whether or not there is rotation along the yaw-axis (e.g., z-axis), the syntax element zero_roll_orientation is set to indicate whether or not there is rotation along the roll-axis (e.g., x-axis), and the syntax element zero_pitch_orientation is set to indicate whether or not there is rotation along the pitch-axis (e.g., y-axis).

When there is rotation along the yaw-axis (i.e., !zero_yaw_orientation==True), the syntax element yaw_orientation_diff is set to indicate a rotation degree difference of the yaw-axis between the content-oriented rotation applied to the current input frame and the content-oriented rotation applied to the at least one previous input frame. When decoding one video frame, the video decoder 122 can determine the rotation degree of the yaw-axis by accumulating the rotation degree difference signaled by the syntax element yaw_orientation_diff.

When there is rotation along the roll-axis (i.e., !zero_roll_orientation==True), the syntax element roll_orientation_diff is set to indicate a rotation degree difference of the roll-axis between the content-oriented rotation applied to the current input frame and the content-oriented rotation applied to the at least one previous input frame. When decoding one video frame, the video decoder 122 can determine the rotation degree of the roll-axis by accumulating the rotation degree difference signaled by the syntax element roll_orientation_diff.

When there is rotation along the pitch-axis (i.e., !zero_pitch_orientation==True), the syntax element pitch_orientation_diff is set to indicate a rotation degree difference of the pitch-axis between the content-oriented rotation applied to the current input frame and the content-oriented rotation applied to the at least one previous input frame. When decoding one video frame, the video decoder 122 can determine the rotation degree of the pitch-axis by accumulating the rotation degree difference signaled by the syntax element pitch_orientation_diff.

Each of the aforementioned first syntax signaling method and second syntax signaling method performs unified syntax signaling of the rotation information regardless of the 360 VR projection format employed. Alternatively, the first syntax signaling method and the second syntax signaling method may be modified to be projection format based syntax signaling methods. That is, syntax signaling of the rotation information could depend on the employed 360 VR projection format.

In accordance with a third syntax signaling method, the following syntax table may be employed.

| vr_extension( ) { | Descriptor |
|---|---|
| vr_content_format | u(4) |
| if ( vr_content_format == 1 ) { | |
| ... | |
| zero_yaw_orientation | u(1) |
| if (!zero_yaw_orientation){ | |
| yaw_orientation_index | u(3) |
| if (yaw_orientation_index == '111') | |
| yaw_orientation_degree | u(9) |
| } | |
| } | |
| else if ( vr_content_format == 2 ) { | |
| ... | |
| zero_roll_orientation | u(1) |
| if (!zero_roll_orientation){ | |
| roll_orientation_index | u(3) |
| if (roll_orientation_index == '111') | |
| roll_orientation_degree | u(9) |
| } | |
| zero_pitch_orientation | u(1) |
| if (!zero_pitch_orientation){ | |
| pitch_orientation_index | u(3) |
| if (pitch_orientation_index == '111') | |
| pitch_orientation_degree | u(8) |
| } | |
| } | |
| else if ( vr_content_format == 3 ) { | |
| ... | |
| zero_roll_orientation | u(1) |
| if (!zero_rollorientation){ | |
| roll_orientation_index | u(3) |
| if (roll_orientation_index == '111') | |
| roll_orientation_degree | u(9) |
| } | |
| } | |
| next_start_code( ) | |
| } | |

In accordance with a fourth syntax signaling method, the following syntax table may be employed.

| vr_extension( ) { | Descriptor |
|---|---|
| vr_content_format | u(4) |
| if ( vr_content_format == 1 ) { | |
| ... | |
| prev_orientation | u(1) |
| if (!prev_orientation) | |
| { | |
| zero_yaw_orientation | u(1) |
| if (!zero_yaw_orientation) | |
| yaw_orientation_diff | se(v) |
| } | |
| } | |
| else if ( vr_content_format == 2 ) { | |
| ... | |
| prev_orientation | u(1) |
| if (!prev_orientation) | |
| zero_roll_orientation | u(1) |
| if (!zero_roll_orientation){ | |
| roll_orientation_diff | se(v) |
| } | |
| zero_pitch_orientation | u(1) |
| if (!zero_pitch_orientation){ | |
| pitch_orientation_diff | se(v) |
| } | |
| } | |
| else if ( vr_content_format == 3 ) { | |
| ... | |
| prev_orientation | u(1) |
| if (!prev_orientation) | |
| zero_roll_orientation | u(1) |
| if (!zero_rollorientation){ | |
| roll_orientation_diff | se(v) |
| } | |
| } | |
| next_start_code( ) | |
| } | |

Different 360 VR projection formats may have different suitable rotation dimensions. For example, the sole yaw rotation may be sufficient for a cubemap projection format. For another example, the sole roll rotation may be sufficient for an equirectangular projection format. Hence, when the 360 VR projection format is the cubemap projection format, the syntax element vr_content_format is set by '1'; and when the 360 VR projection format is the equirectangular projection format, the syntax element vr_content_format is set by "3". In this example, vr_content_format=1/3 has one dimension of rotation for syntax signaling, and vr_content_format=2 has two dimensions of rotation for syntax signaling. To put it simply, regarding each of third syntax signal method and fourth syntax signaling method, rotation axis selection of the content-oriented rotation varies depending upon the syntax element vr_content_format that is set on the basis of the employed 360 VR projection format. Since a person skilled in the art can readily understand details of the third syntax signal method and the fourth syntax signaling method after reading above paragraphs directed to the first syntax signal method and the second syntax signaling method, further description is omitted here for brevity.

In accordance with a fifth syntax signaling method, the following syntax table may be employed.

| vr_content_orientation_extension( ) { | Descriptor |
|---|---|
| disable_content_orientation | u(1) |
| if (!disable_content_orientation) { | |
| roll_orientation_degree | u(n) |
| yaw_orientation_degree | u(n) |
| pitch_orientation_degree | u(n) |
| } | |
| } | |

A one-bit on/off flag (disable_content_orientation) is used to indicate whether or not the content-oriented rotation of the 360-degree image/video content in the current input frame is enabled. When the content-oriented rotation of the 360-degree image/video content in the current input frame is enabled, the syntax element disable_content_orientation is set by '0'; and when the content-oriented rotation of the 360-degree image/video content in the current input frame is disabled, the syntax element disable_content_orientation is set by '1'. In a case where the content-oriented rotation of the 360-degree image/video content in the current input frame is enabled (i.e., !disable_content_orientation==True), the syntax element roll_orientation_degree is set to indicate a rotation degree of the roll-axis (e.g., x-axis), the syntax element yaw_orientation_degree is set to indicate a rotation degree of the yaw-axis (e.g., z-axis), and the syntax element pitch_orientation_degree is set to indicate a rotation degree of the pitch-axis (e.g., y-axis).

When the fifth syntax signaling method is employed, the rotation information of the content-oriented rotation may be indicated in a sequence-level header. For example, the rotation information of the content-oriented rotation may be indicated in SPS/PPS or Supplementary Enhancement Information (SEI) by signaling a rotation degree of each rotation axis. Alternatively, when the fifth syntax signaling method is employed, the rotation information of the content-oriented rotation may be indicated in a picture-level header for each video frame.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video processing method comprising:
   receiving a bitstream;
   processing the bitstream to obtain at least one syntax element from the bitstream; and
   decoding the bitstream to generate a current decoded frame having a rotated 360-degree image/video content represented in a 360-degree Virtual Reality (360 VR) projection format;
   wherein said at least one syntax element signaled via the bitstream indicates rotation information of content-oriented rotation that is involved in generating the rotated 360-degree image/video content, and comprises:
   a first syntax element, wherein when the content-oriented rotation is enabled, the first syntax element indicates a rotation degree along a specific rotation axis; and
   a second syntax element, wherein the second syntax element indicates whether or not the content-oriented rotation is enabled.

2. The video processing method of claim 1, further comprising:
   rendering and displaying an output image data on a display screen according to the current decoded frame and the rotation information.

3. A video processing method comprising:
   receiving a bitstream;
   processing the bitstream to obtain at least one syntax element from the bitstream; and
   decoding the bitstream to generate a current decoded frame having a rotated 360-degree image/video content represented in a 360-degree Virtual Reality (360 VR) projection format;
   wherein said at least one syntax element signaled via the bitstream indicates rotation information of content-oriented rotation that is involved in generating the rotated 360-degree image/video content, and comprises:
   a first syntax element, wherein the first syntax element indicates whether or not the content-oriented rotation involved in generating the rotated 360-degree image/video content in the current decoded frame is the same as content-oriented rotation involved in generating a rotated 360-degree image/video content in at least one previous decoded frame; and
   a second syntax element, wherein when the content-oriented rotation involved in generating the rotated 360-degree image/video content in the current decoded frame is different from the content-oriented rotation involved in generating the rotated 360-degree image/video content in said at least one previous decoded frame, the second syntax element indicates whether or not there is rotation along a specific rotation axis.

4. The video processing method of claim 3, wherein said at least one syntax element further comprises:
   a third syntax element, wherein when there is rotation along the specific rotation axis, the third syntax element indicates a difference between a rotation degree along the specific rotation axis in the content-oriented rotation involved in generating the rotated 360-degree image/video content in the current decoded frame and a rotation degree along the specific rotation axis in the content-oriented rotation involved in generating the rotated 360-degree image/video content in said at least one previous decoded frame.

5. The video processing method of claim 3, wherein said at least one syntax element further comprises:
   a third syntax element, wherein the third syntax element has a first value when the 360 VR projection format is a first projection format, and has a second value when the 360 VR projection format is a second projection format different from the first projection format, and the specific rotation axis varies depending upon the third syntax element.

6. A video processing apparatus comprising:

a video decoder, arranged to receive a bitstream, process the bitstream to obtain at least one syntax element from the bitstream, and decode the bitstream to generate a current decoded frame having a rotated 360-degree image/video content represented in a 360-degree Virtual Reality (360 VR) projection format;

wherein said at least one syntax element signaled via the bitstream indicates rotation information of content-oriented rotation that is involved in generating the rotated 360-degree image/video content, and comprises:

a first syntax element, wherein when the content-oriented rotation is enabled, the syntax element indicates a rotation degree along a specific rotation axis; and a second syntax element, wherein the second syntax element indicates whether or not the content-oriented rotation is enabled.

7. The video processing apparatus of claim 6, further comprising:

a graphic rendering circuit, arranged to render and display an output image data on a display screen according to the current decoded frame and the rotation information.

* * * * *